(12) United States Patent
Matsuzawa

(10) Patent No.: US 11,697,204 B2
(45) Date of Patent: Jul. 11, 2023

(54) CONTROL DEVICE FOR LINK OPERATION DEVICE

(71) Applicant: NTN CORPORATION, Osaka (JP)

(72) Inventor: Hideki Matsuzawa, Iwata (JP)

(73) Assignee: NTN CORPORATION, Osaka (JP)

( * ) Notice: Subject to any disclaimer, the term of this patent is extended or adjusted under 35 U.S.C. 154(b) by 147 days.

(21) Appl. No.: 17/333,566

(22) Filed: May 28, 2021

(65) Prior Publication Data
US 2021/0283772 A1    Sep. 16, 2021

Related U.S. Application Data

(63) Continuation of application No. PCT/JP2019/046051, filed on Nov. 26, 2019.

(30) Foreign Application Priority Data

Nov. 29, 2018    (JP) ................. 2018-223789

(51) Int. Cl.
*B25J 9/16*    (2006.01)
*B25J 9/00*    (2006.01)
(Continued)

(52) U.S. Cl.
CPC .......... *B25J 9/1623* (2013.01); *B25J 9/0048* (2013.01); *B25J 9/023* (2013.01); *B25J 9/163* (2013.01); *B25J 9/126* (2013.01)

(58) Field of Classification Search
CPC . B25J 9/0048; B25J 9/023; B25J 9/126; B25J 9/1605; B25J 9/1623; B25J 9/163; B25J 9/1692; F16H 21/54
See application file for complete search history.

(56) References Cited

U.S. PATENT DOCUMENTS 9,073,204 B2    7/2015  Isobe et al.
9,522,469 B2    12/2016 Isobe et al.
(Continued)

FOREIGN PATENT DOCUMENTS

JP    2011-240440 A    12/2011
JP    2013-202725 A    10/2013
JP    5864322            1/2016

OTHER PUBLICATIONS

Notification of Transmittal of Translation of the International Preliminary Report on Patentability for Application No. PCT/JP2019/046051 dated Jun. 10, 2021.
(Continued)

*Primary Examiner* — Dale Moyer

(57) ABSTRACT

A link actuation device includes: a parallel link mechanism including a proximal-side link hub, a distal-side link hub, and three or more link mechanisms coupling the distal-side link hub to the proximal-side link hub such that a posture of the distal-side link hub can be changed with respect to the proximal-side link hub; actuators for changing the posture; and a teaching unit including a conversion unit configured to calculate coordinates (Wt (=Xt, Yt, Zt)) of a distal-side link center of the distal-side link hub, which are expressed in orthogonal coordinates, from rotation angles ($\beta n$; n=1, 2, . . . ) of the end link members. A normal vector is applied to equations of a plane and of a sphere, and the equations are rearranged and used in the conversion unit.

4 Claims, 10 Drawing Sheets

(51) Int. Cl.
*B25J 9/02* (2006.01)
*B25J 9/12* (2006.01)

(56) References Cited

U.S. PATENT DOCUMENTS

| | | | |
|---|---|---|---|
| 2013/0055843 A1* | 3/2013 | Isobe | F16C 1/02 901/15 |
| 2015/0088308 A1* | 3/2015 | Isobe | B25J 9/12 700/245 |
| 2017/0268640 A1* | 9/2017 | Sakata | F16H 21/48 |

OTHER PUBLICATIONS

Extended European Search report dated Jul. 8, 2022 in European Patent Application No. 19890334.6 (7 pages).
Japanese Office Action dated Sep. 17, 2019 in Japanese Patent Application No. 2018-223789.
Japanese Decision to Grant a Patent dated Dec. 24, 20219 in Japanese Patent Application No. 2018-223789.
International Search Report dated Jan. 7, 2020 in International Patent Application No. PCT/JP2019/046051.

* cited by examiner

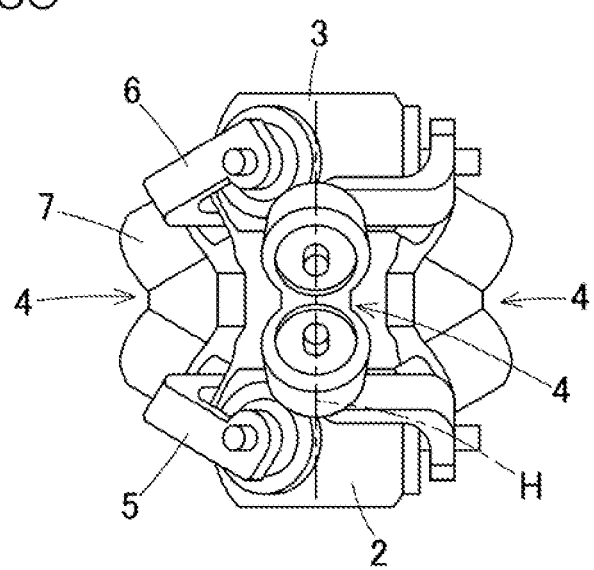

CONTROL DEVICE FOR LINK OPERATION DEVICE

CROSS REFERENCE TO THE RELATED APPLICATION

This application is a continuation application, under 35 U.S.C. § 111(a) of international patent application No. PCT/JP2019/046051, filed Nov. 26, 2019, which claims priority to Japanese patent application No. 2018-223789, filed Nov. 29, 2018, the entire disclosures of all of which are herein incorporated by reference as a part of this application.

BACKGROUND OF THE INVENTION

Field of the Invention

The present invention relates to a control device for a link actuation device of a parallel link mechanism type, the control device being configured to teach and control the link actuation device used in industrial equipment and/or medical equipment which require a precise and wide operation range.

Description of Related Art

A link actuation device including a parallel link mechanism is a device having two degrees of freedom, which can be represented by a polar coordinate system. A relational expression between a spherical center of a distal-side link hub of the device (i.e., a center of the distal-side link hub) and a spherical center of a proximal-side link hub of the device is described in Patent Document 1 listed below. Inverse conversion is performed to calculate a rotation angle of a motor for turning a proximal-side end link member from coordinates of a distal-side link center, which is the spherical center of the distal-side link hub. In a similar manner, forward conversion is performed to calculate the coordinates from rotation angles of two proximal-side shafts as an approximate solution obtained by the Newton-Raphson method.

RELATED DOCUMENT

Patent Document

[Patent Document 1] JP Patent No. 5864322

SUMMARY OF THE INVENTION

One method of teaching a link actuation device may include manually moving a distal-side link hub to a destination and calculating coordinates of a distal-side link center, which are expressed in orthogonal coordinates, from a rotation angle of a proximal-side end link member at the destination.

However, the Newton-Raphson method is employed in Patent Document 1 as a method of determining coordinates of the distal-side link center from the rotation angles of the two proximal-side shafts, to obtain an approximate solution. Accordingly, there is a problem that the method is time-consuming because the approximate solution is obtained by iterative calculations. Except for the approximate solution, there is no relational expression for determining coordinates of a distal part on the basis of the two proximal-side shafts in such a parallel link mechanism having two degrees of freedom, and there is no other way but to use the approximate solution. Thus, calculation of a teaching has been time-consuming. In addition, use of the approximate solution results in poor accuracy in the coordinates of the location of the distal portion. For these reasons, there has been a problem that where the link actuation device is moved using the taught coordinates of the distal portion (in particular, where the link actuation device is moved through multiple points at high speed), sufficient accuracy cannot be obtained in torque application control for suppressing shaking due to mechanistic play, and sufficient positioning accuracy and/or orbital accuracy cannot be obtained either.

In order to solve the problem, an object of the present invention is to provide a control device for a link actuation device including a parallel link mechanism having two degrees of freedom, the control device being capable of calculating coordinates of a distal-side link center, which are expressed in orthogonal coordinates, from a rotation angle of an end link member without calculating an approximate solution, so that the coordinates can be more accurately calculated in a shorter time.

Another object of the present invention is to provide a control device for a link actuation device including a parallel link mechanism having two degrees of freedom, the control device being capable of accurately calculating a rotation angle of an end link member from coordinates of a distal-side link center, which are expressed in orthogonal coordinates, in a short time so as to improve positioning accuracy and orbital accuracy when controlling the link actuation device.

A control device for a link actuation device according to the present invention will be described with reference numbers used for embodiments.

The present invention provides a first control device for a link actuation device, the control device being configured to control actuators of the link actuation device, the link actuation device including:
  a parallel link mechanism including
    a proximal-side link hub,
    a distal-side link hub,
    three or more link mechanisms coupling the distal-side link hub to the proximal-side link hub such that a posture of the distal-side link hub can be changed with respect to the proximal-side link hub, each of the link mechanisms including a proximal-side end link member having one end rotatably coupled to the proximal-side link hub, a distal-side end link member having one end rotatably coupled to the distal-side link hub, and an intermediate link member having opposite ends rotatably coupled to other ends of the proximal-side end link member and the distal-side end link member, each of the link mechanisms being shaped such that in a geometric model representing that link mechanism by straight lines, a proximal-side part and a distal-side part of that link mechanism with respect to a center part of the intermediate link member are symmetrical to each other; and
  the actuators configured to turn proximal-side end link members of two or more link mechanisms of the three or more link mechanisms,
wherein the control device includes a teaching unit 56 configured to teach a posture of the distal-side link hub.

The teaching unit 56 includes a conversion unit 61 configured to calculate a distal-side link center Wt (=Xt, Yt, Zt) (B), which is a center of the distal-side link hub 3 and is expressed in orthogonal coordinates, as the posture of the distal-side link hub 3 from rotation angles $\beta n$ (n=1, 2, ...) of the at least two end link members 5 coupled to the respective actuators 53.

The orthogonal coordinates are defined in an orthogonal coordinate system having an origin O at an intersection between a center axis QA of the proximal-side link hub 2 and a two-dimensional orthogonal coordinate system perpendicular to the center axis QA, and a coordinate axis, as a Z axis, having a positive direction extending away from the proximal-side link hub 2 along a center axis QB of the distal-side link hub 3 placed at a bending angle θ of 0°, the bending angle being a vertical angle at which the center axis QB of the distal-side link hub 3 is inclined with respect to the center axis QA of the proximal-side link hub 2, and an X axis and a Y axis constituted as a right-handed coordinate system with respect to the Z axis.

The conversion unit is configured to apply a normal vector to equations of a plane and of a sphere as described later in embodiments, the normal vector being a vector extending from a proximal-side link center, which is a center of the proximal-side link hub, toward an orbital center of the distal-side link center. The normal vector is a normal vector Nn (An, Bn, Cn) expressed by the following formulae:

$$An = lo \cos\left(\frac{\pi}{2} - \gamma/2\right)\cos(\beta n)\cos(\eta n) \qquad \text{[Math 1]}$$
$$Bn = lo \cos\left(\frac{\pi}{2} - \gamma/2\right)\cos(\beta n)\sin(\eta n)$$
$$Cn = lo \cos\left(\frac{\pi}{2} - \gamma/2\right)\sin(\beta n)$$

wherein n: a number (=1, 2, ... ) indicating the system of each link mechanism, lo: a distance (fixed value) between the center C of the proximal-side link hub and the center B of the distal-side link hub, γ: an axis angle of the intermediate link member (an angle defined by two coupling center axes of connections at which the opposite ends of the intermediate link member are coupled to the end link members), βn: a rotation angle of a base end of each end link member, ηn: a phase angle, and An, Bn, Cn: axial components in the orthogonal coordinate system.

According to this constitution, it is possible to calculate the distal-side link center B, which is expressed in orthogonal coordinates, from the rotation angles βn of the proximal-side end link members 5 in the link actuation device 51 including the parallel link mechanism 1 having two degrees of freedom, without calculating an approximate solution. Thus, iterative calculations as in a case of calculating an approximate solution are not necessary, and therefore, the coordinates can be accurately calculated in a shorter time.

In the present invention, the parallel link mechanism may have a rotationally-symmetric configuration. In the present invention, the parallel link mechanism may have a mirror-symmetric configuration. Irrespective of whether the parallel link mechanism has a rotationally-symmetric configuration or a mirror-symmetric configuration, the above formulae are valid.

A second control device 54 for a link actuation device according to the present invention includes a conversion unit 61A of a control unit 55 configured to control the respective actuators 53, the conversion unit 61A being configured to apply a normal vector to equations of a plane and of a sphere as described later in embodiments, the normal vector being a vector extending from a proximal-side link center, which is a center of the proximal-side link hub, toward an orbital center of the distal-side link center.

The link actuation device has the same construction as described for the first control device for the link actuation device.

The control unit 55 configured to control the respective actuators 53 includes a conversion unit 61A configured to calculate rotation angles βn (n=1, 2, ... ) of the at least two proximal-side end link members 5 coupled to the respective actuators 53 from a distal-side link center Wt (=Xt, Yt, Zt) (B), which is a center of the distal-side link hub 2 and is expressed in orthogonal coordinates, as the posture of the distal-side link hub 3 by using the following formulae.

The orthogonal coordinates and the respective formulae are reproduced below, although they are the same as those described for the first control device for the link actuation device.

The orthogonal coordinates are defined in an orthogonal coordinate system having an origin at an intersection between a center axis of the proximal-side link hub and a two-dimensional orthogonal coordinate system perpendicular to the center axis, and a coordinate axis, as a Z axis, having a positive direction extending away from the proximal-side link hub along the center axis of the distal-side link hub placed at a bending angle θ of 0°, the bending angle being a vertical angle at which the center axis of the distal-side link hub is inclined with respect to the center axis of the proximal-side link hub, and an X axis and a Y axis constituted as a right-handed coordinate system with respect to the Z axis.

The normal vector is a normal vector Nn (An, Bn, Cn) expressed by the following formulae:

$$An = lo \cos\left(\frac{\pi}{2} - \gamma/2\right)\cos(\beta n)\cos(\eta n) \qquad \text{[Math 2]}$$
$$Bn = lo \cos\left(\frac{\pi}{2} - \gamma/2\right)\cos(\beta n)\sin(\eta n)$$
$$Cn = lo \cos\left(\frac{\pi}{2} - \gamma/2\right)\sin(\beta n)$$

wherein n: a number (=1, 2, ... ) indicating the system of each link mechanism, lo: a distance (fixed value) between the center C of the proximal-side link hub and the center B of the distal-side link hub, γ: an axis angle of the intermediate link member (an angle defined by two coupling center axes of connections at which the opposite ends of the intermediate link member are coupled to the end link members), βn: a rotation angle of a base end of each end link member, ηn: a phase angle, and An, Bn, Cn: axial components in the orthogonal coordinate system.

This constitution makes it possible to calculate the rotation angles of the end link members from the distal-side link center, which is expressed in orthogonal coordinates, in the link actuation device including the parallel link mechanism having two degrees of freedom, without calculating an approximate solution. Thus, iterative calculations as in a case of calculating an approximate solution are not necessary, and therefore, the rotation angles can be accurately calculated in a shorter time. Thus, in a case of multi-point movement, an equipment takt time can be reduced thanks to high-speed movement. In addition, since the rotation angles are accurately calculated, accuracy of fixed-torque addition control for suppressing shaking due to mechanistic play is improved, leading to improved positioning accuracy and/or orbital accuracy.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views:

FIG. 10C is a perspective view illustrating a rotationally-symmetric and mirror-symmetric configuration of the parallel link mechanism.

DESCRIPTION OF THE EMBODIMENTS

Figure 1A:
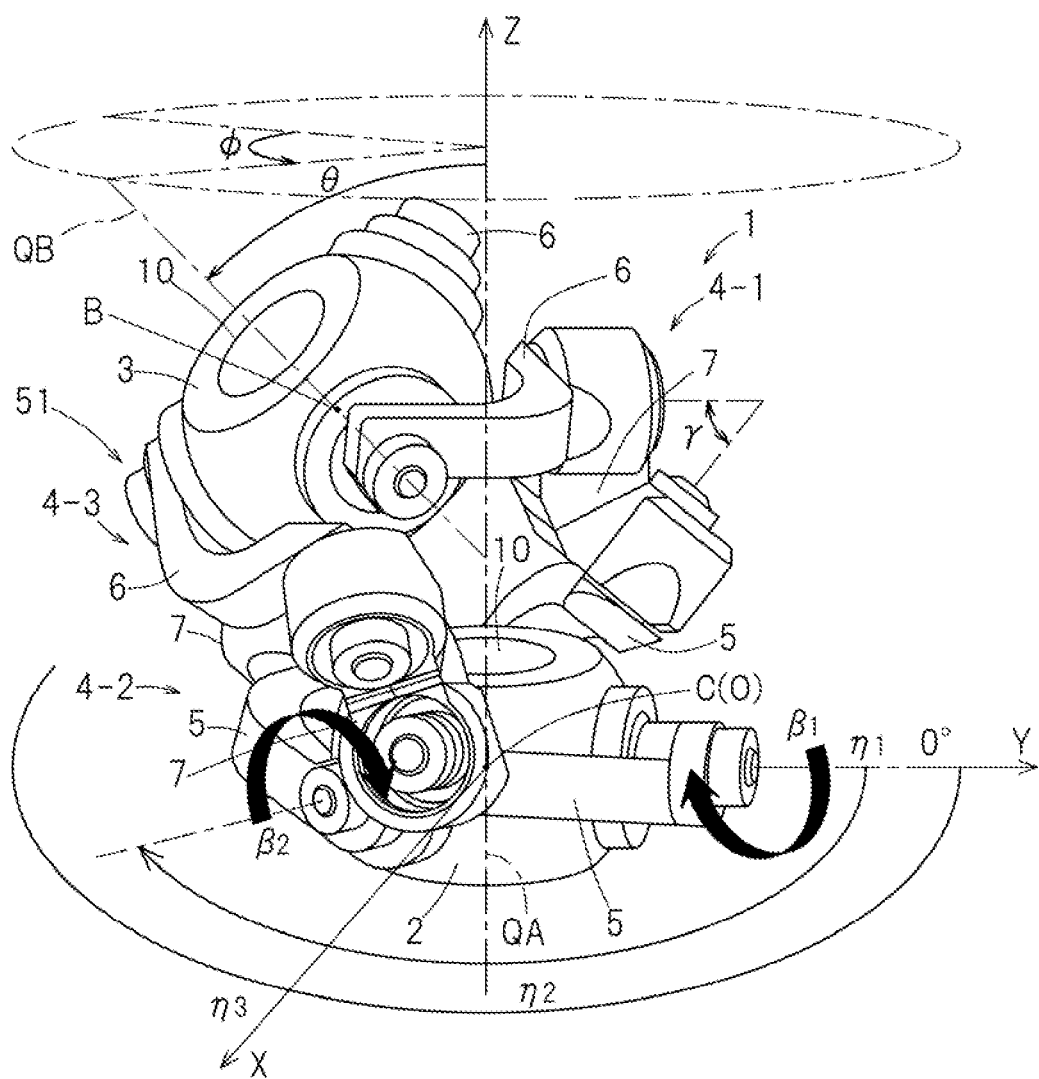
FIG. 1A is a perspective view of a parallel link mechanism of a link actuation device according to an embodiment of the present invention.
Figure 1B:
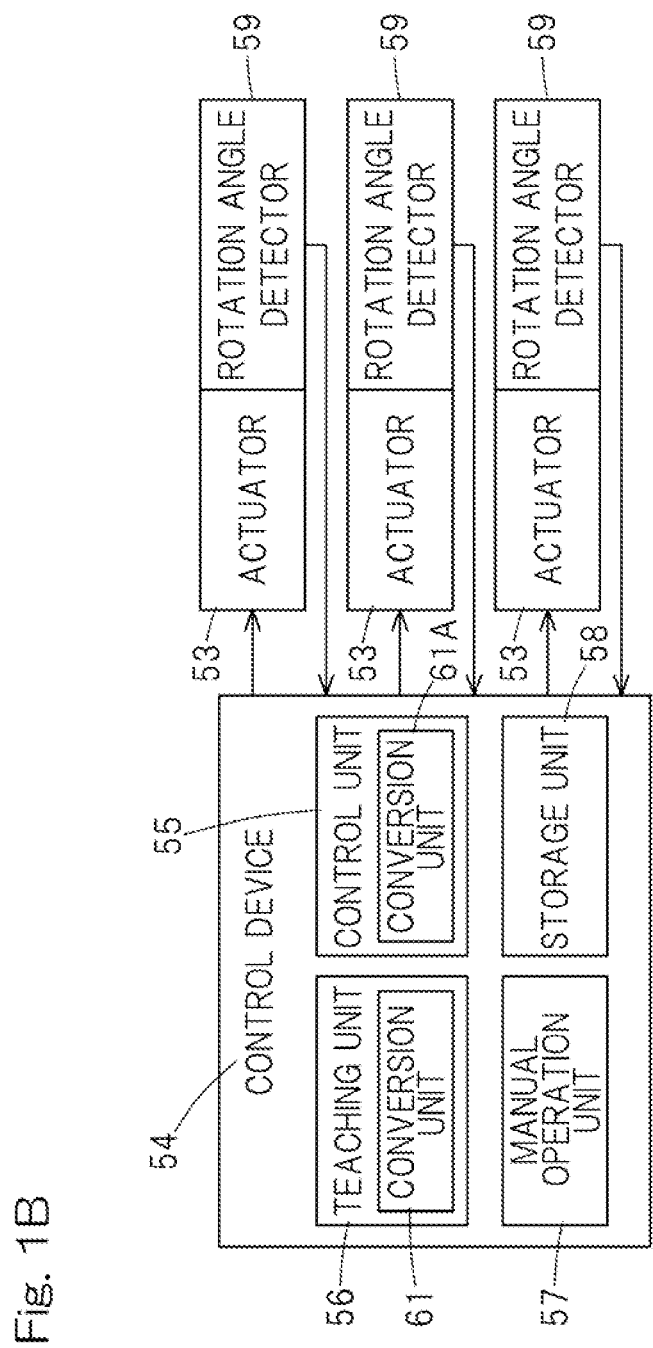
FIG. 1B is a block diagram of conceptual features of a control device of the link actuation device.

A control device for a link actuation device according to an embodiment of the present invention will be described with reference to the drawings. As shown in FIG. 1A and FIG. 1B, a link actuation device 51 includes a parallel link mechanism 1 and a plurality of actuators 53 configured to actuate the parallel link mechanism 1, and is controlled and taught by a control device 54. The control device 54 includes a control unit 55 configured to control the actuators 53, a teaching unit 56, a manual operation unit 57, and a storage unit 58.

Parallel Link Mechanism 1

Figure 2:
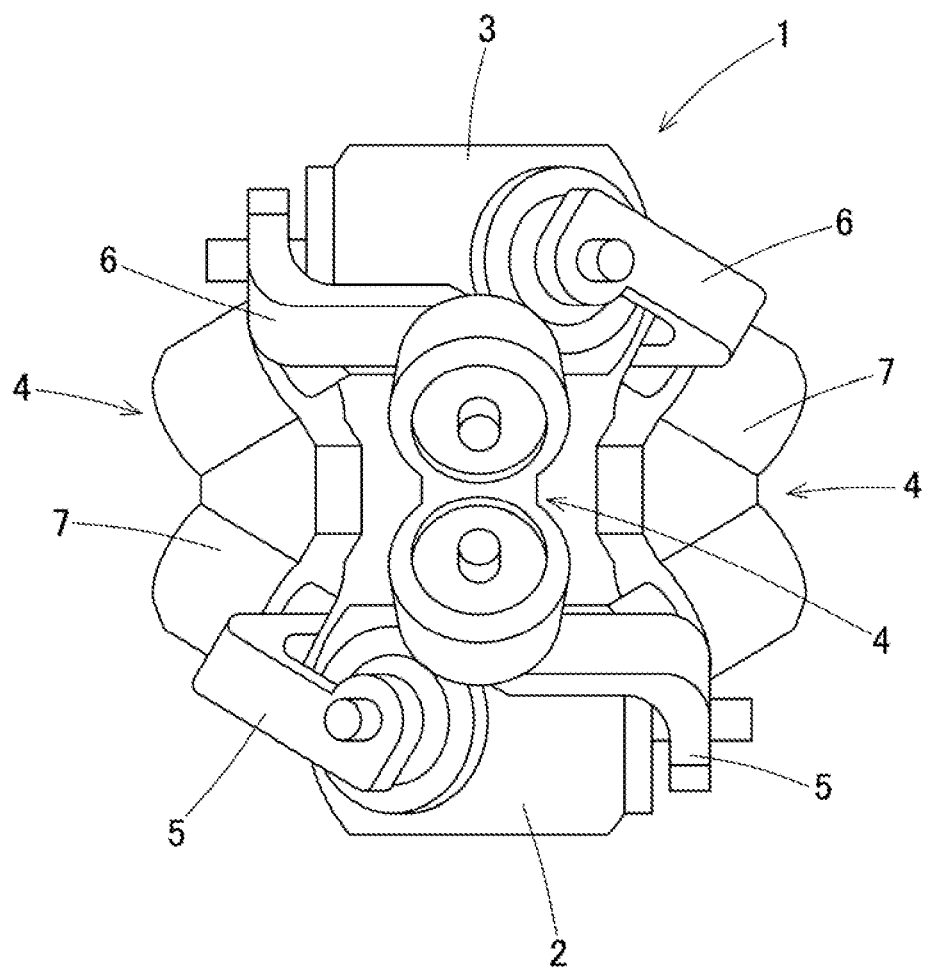
FIG. 2 is a perspective view illustrating an operation state of the parallel link mechanism, which is different from that shown in FIG. 1.
Figure 3:
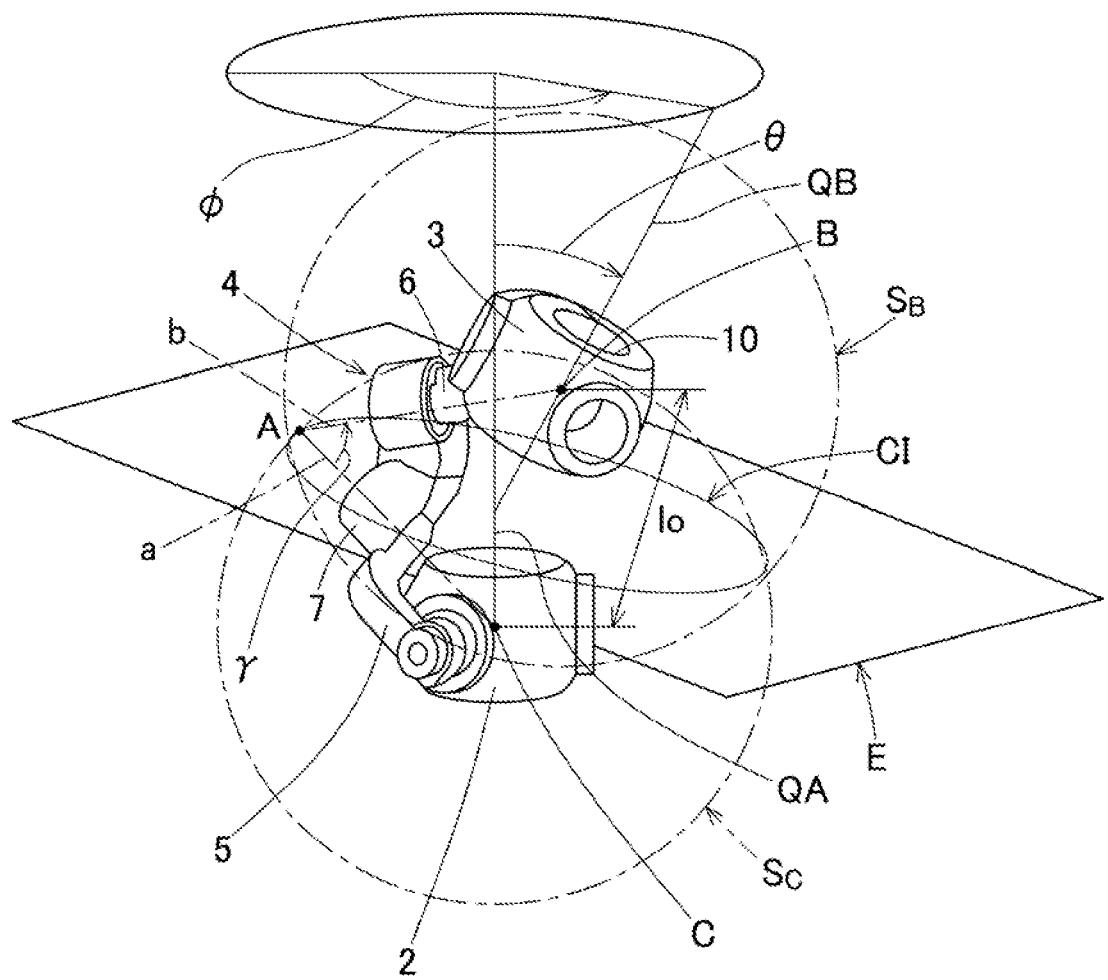
FIG. 3 is a perspective view of one link mechanism of the parallel link mechanism.
Figure 4:
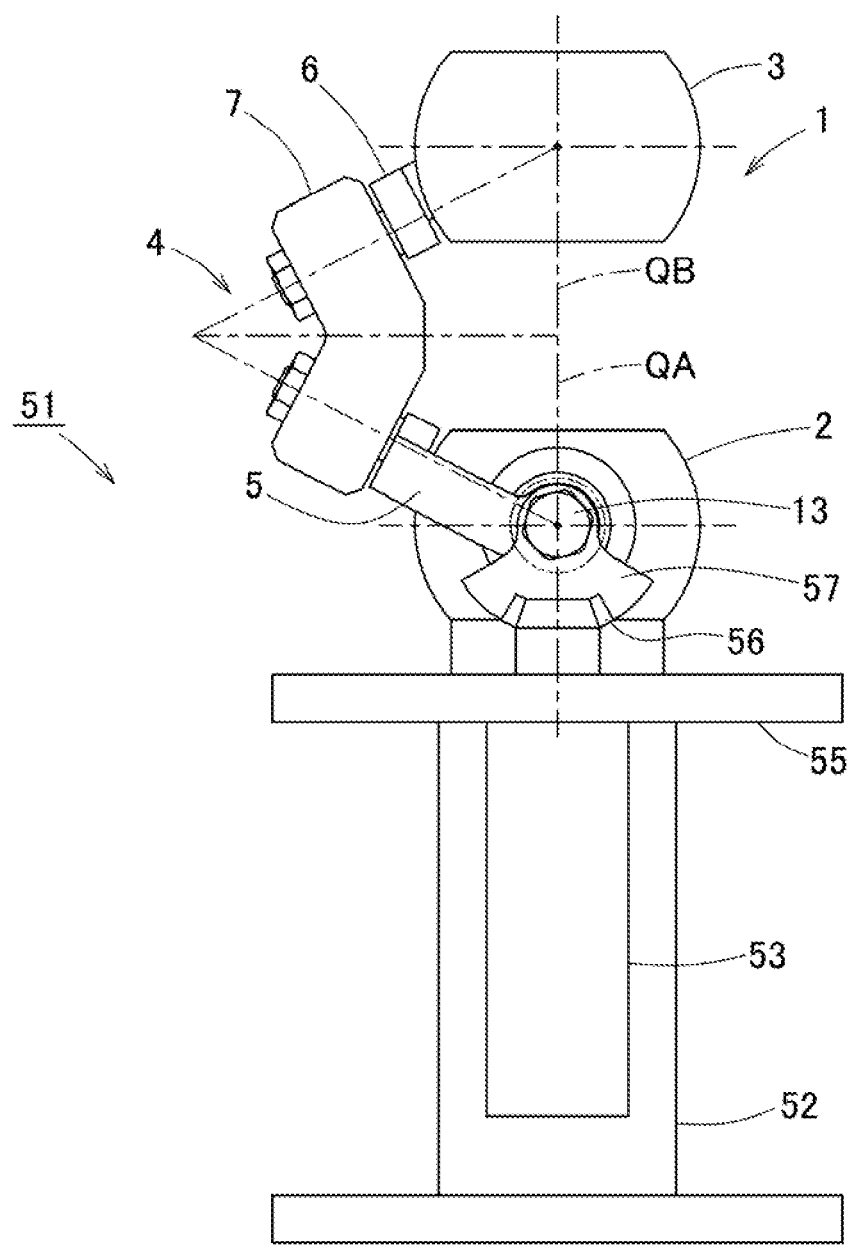
FIG. 4 is a front view of the link actuation device, with a part of which omitted.

The parallel link mechanism 1 includes a proximal-side link hub 2, a distal-side link hub 3, and three link mechanisms 4 (4-1, 4-2, 4-3) coupling the distal-side link hub 3 to the proximal-side link hub 2 such that a posture of the distal-side link hub 3 can be changed with respect to the proximal-side link hub 2. The proximal-side link hub 2 is disposed on a base mount 52 as shown in FIG. 4. FIG. 1A and FIG. 2 show the parallel link mechanism 1 in different operation states, and FIG. 3 to FIG. 5A and FIG. 5B show one link mechanism 4 of the parallel link mechanism 1.

Figure 5A:
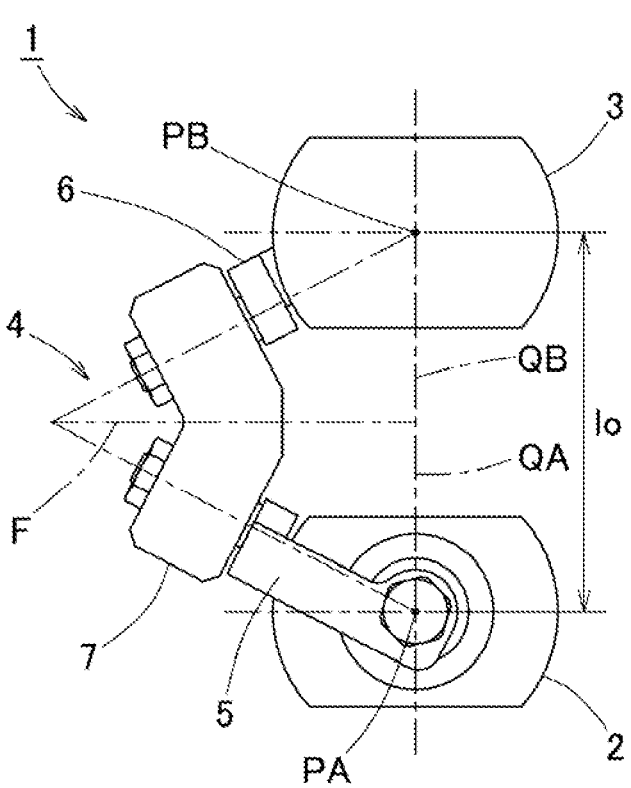
FIG. 5A is a front view illustrating a posture of one link mechanism of the parallel link mechanism.
Figure 5B:
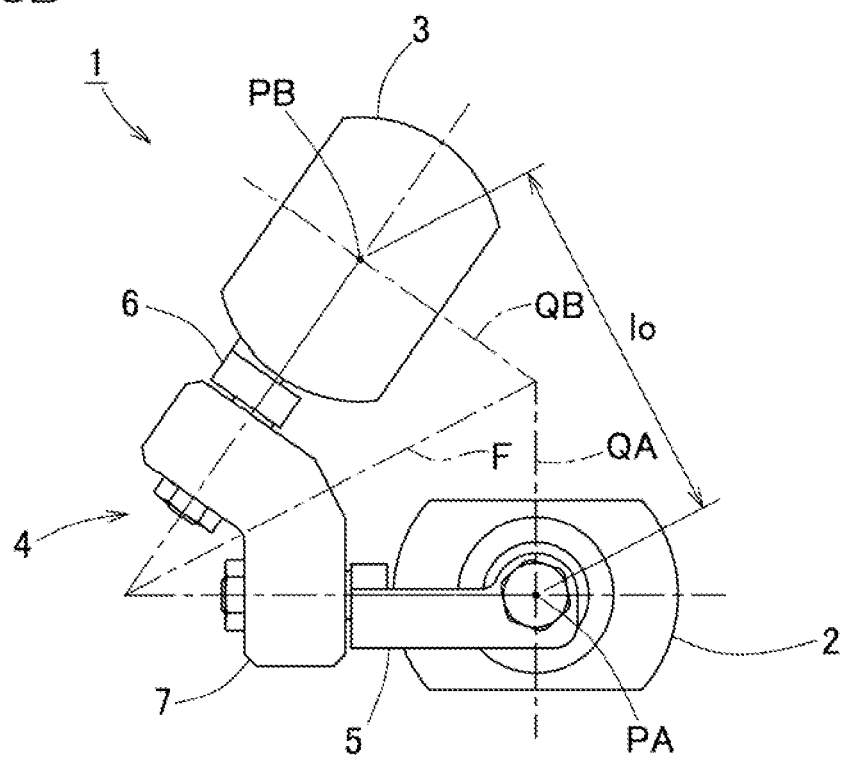
FIG. 5B is a front view illustrating another posture of one link mechanism of the parallel link mechanism, which is different from that shown in FIG. 5A.

FIG. 5A and FIG. 5B are front views illustrating one link mechanism 4 in different states. Each of the link mechanisms 4 is constituted by a proximal-side end link member 5, a distal-side end link member 6, and an intermediate link member 7, and forms a triple-chain link mechanism having four revolute pairs. Each of the proximal-side and distal-side end link members 5, 6 has an L shape (see FIG. 1A, FIG. 1B to FIG. 3). The proximal-side end link member 5 has a base end rotatably coupled to the proximal-side link hub 2, and the distal-side end link member 6 has a base end rotatably coupled to the distal-side link hub 3. The intermediate link member 7 has opposite ends rotatably coupled to tip ends of the proximal-side and distal-side end link members 5, 6. In the following description, the proximal-side end link member 5 may sometimes be referred to as "proximal-side arm."

Each of the proximal-side and distal-side end link members 5, 6 has a spherical link structure. The three link mechanisms 4 have proximal-side and distal-side spherical link centers corresponding to a proximal-side link center PA, which is the center of the proximal-side link hub 2, and a distal-side link center PB which is the center of the distal-side link hub 3, respectively. Therefore, a distance between the spherical link centers of the three link mechanisms 4 corresponds to a distance lo between the proximal-side link center PA and the distal-side link center PB. The center axes of the respective revolute pairs of the end link members 5, 6 and the intermediate link member 7 may have a certain intersecting angle or may be parallel to each other.

Figure 6:
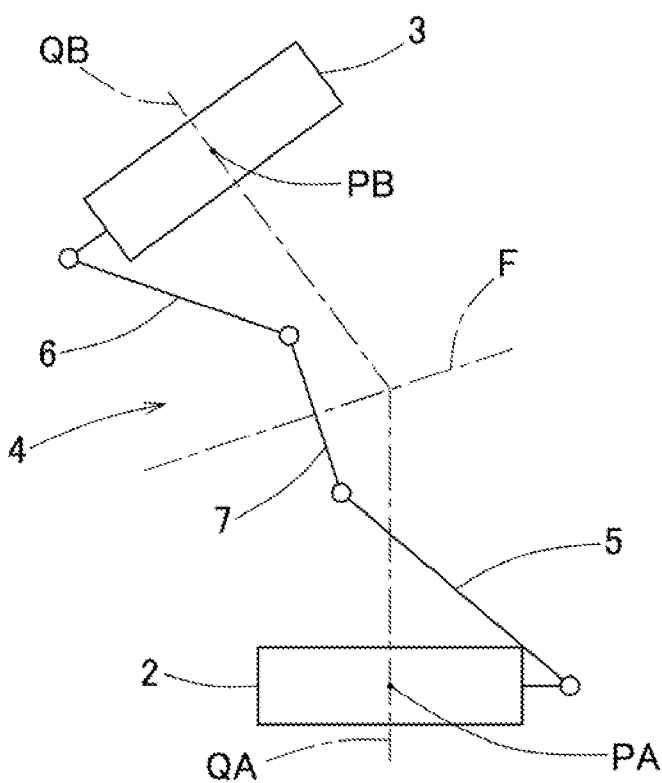
FIG. 6 is a model diagram illustrating one link mechanism of the parallel link mechanism by straight lines.

That is, the three link mechanisms 4 have geometrically the same shape. The expression "geometrically the same shape" means that a geometric model that represents the respective link members 5, 6, 7 by straight lines, i.e., a model that is expressed by the respective revolute pairs and the straight lines connecting these revolute pairs (see FIG. 6) has such a shape that a proximal-side part and a distal-side part are symmetrical to each other with respect to a central part of the intermediate link member 7. FIG. 6 is a diagram illustrating one link mechanism 4 by straight lines.

Each of the link mechanisms 4 of the present embodiment is of a rotationally-symmetric type, in which the positional relation of a proximal-side part composed of, the proximal-side link hub 2 and the proximal-side end link member 5, with respect to a distal-side part composed of, the distal-side link hub 3 and the distal-side end link member 6 is rotationally symmetric about a center line F of the intermediate link member 7. FIG. 5A shows a state in which the center axis QA of the proximal-side link hub 2 and the center axis QB of the distal-side link hub 3 are located on a same line. FIG. 5B shows a state in which the center axis QB of the distal-side link hub 3 has a predetermined actuation angle with respect to the center axis QA of the proximal-side link hub 2. The distance lo between the centers PA, PB of the proximal-side and distal-side links does not change, even when the respective link mechanisms 4 change their postures.

The proximal-side link hub 2, the distal-side link hub 3, and the three link mechanisms 4 cooperate together to constitute a two-degree-of-freedom mechanism in which the distal-side link hub 3 is movable with respect to the proximal-side link hub 2 in two axial directions perpendicular to each other. In other words, this mechanism allows the distal-side link hub 3 to be rotated with two degrees of freedom to change its posture with respect to the proximal-side link hub 2. This two-degree-of-freedom mechanism has a compact constitution and provides a wide operation range of the distal-side link hub 3 with respect to the proximal-side link hub 2. For example, a bending angle θ (FIG. 1A, FIG. 3) between the center axis QA of the proximal-side link hub 2 and the center axis QB of the distal-side link hub 3 may have a maximum value (maximum bending angle) of about ±90°.

It may also be possible to set a turning angle φ of the distal-side link hub 3 with respect to the proximal-side link hub 2 in a range from 0° to 360°. The bending angle θ is a vertical angle in which the center axis QB of the distal-side link hub 3 is inclined with respect to the center axis QA of the proximal-side link hub 2, and the turning angle φ is a horizontal angle in which the center axis QB of the distal-side link hub 3 is inclined with respect to the center axis QA of the proximal-side link hub 2.

Where the following conditions (1) to (3) are satisfied in the parallel link mechanism 1, the proximal-side part composed of, the proximal-side link hub 2 and the proximal-side end link member 5, move in the same manner as the distal-side part composed of, the distal-side link hub 3 and the distal-side end link member 6, because of the geometric symmetry, as long as the angular and positional relation between the intermediate link member 7 and the proximal-side end link member 5 is the same as that between the intermediate link member 7 and the distal-side end link member 6 with respect to a symmetry plane of the intermediate link member 7.

Condition (1): The end link members 5, 6 of each link mechanism 4 have shaft members 13 (FIG. 7) disposed at a same angle and having a same length.

Condition (2): The proximal-side end link member 5 and the distal-side end link member 6 have a same geometrical shape.

Condition (3): The intermediate link member 7 also has a proximal-side portion and a distal-side portion of a same shape.

For example, where the proximal-side and distal-side link hubs 2, 3 have rotation axes coaxial with the respective center axes QA, QB, and rotation is transmitted from the proximal side to the distal side, this mechanism constitutes a constant-speed universal joint in which the proximal-side part and the distal-side part rotate at a constant speed and at a same rotation angle. The symmetry plane of the intermediate link member 7 during the constant-speed rotation is referred to as constant-speed bisecting plane E (FIG. 3).

Accordingly, where the plurality of link mechanisms 4 of the same geometrical shape which share the proximal-side link hub 2 and the distal-side link hub 3 are arranged on a circumference, the intermediate link members 7 can only move on the constant-speed bisecting plane E, so that the plurality of link mechanisms 4 can move without contradiction. This allows the proximal-side part and the distal-side part to rotate at a constant speed, even when the proximal-side part and the distal-side part form an arbitrary operation angle.

In the present embodiment, each of the proximal-side link hub 2 and the distal-side link hub 3 has a donut shape having a center part formed with a through-hole 10 along the axial direction and a spherical contour. The center of the through-hole 10 coincides with the center axes QA, QB of the link hubs 2, 3. The proximal-side end link members 5 are rotatably coupled to an outer peripheral surface of the proximal-side link hub 2 at equal intervals in a circumferential direction of the proximal-side link hub 2, and the distal-side end link members 6 are rotatably coupled to an outer peripheral surface of the distal-side link hub 3 at equal intervals in a circumferential direction of the distal-side link hub 3.

Figure 7:
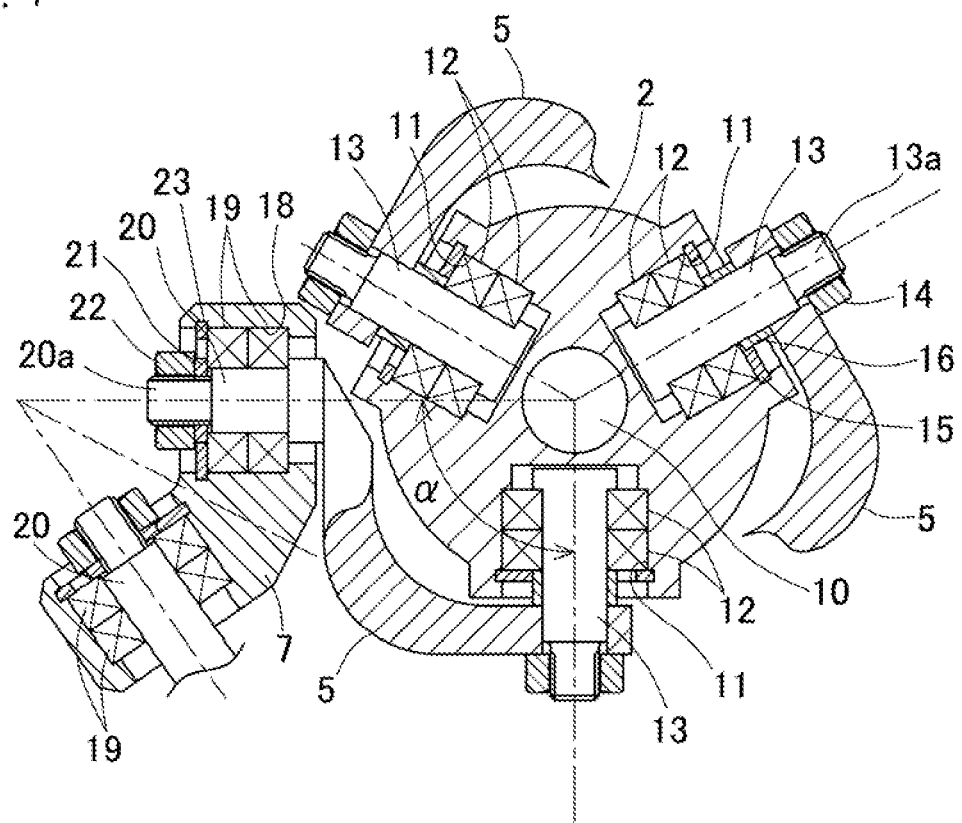
FIG. 7 is a sectional view illustrating connections between a proximal-side link hub and end links of the link actuation device.

FIG. 7 is a sectional view illustrating revolute pairs of the proximal-side link hub 2 and the proximal-side end link members 5 as well as a revolute pair of the proximal-side end link member 5 and the intermediate link member 7. The proximal-side link hub 2 is formed with communication holes 11 extending in a radial direction of the proximal-side link hub 2 and communicating the axial through-hole 10 with an outer peripheral side at three circumferential positions. Two bearings 12 are disposed in each of the communication holes 11 and rotatably support a shaft member 13. The shaft member 13 has a protruding threaded portion 13a at an outer end portion thereof protruding from the proximal-side link hub 2, and the proximal-side end link member 5 is coupled to the protruding threaded portion 13a and is fastened thereto by a nut 14.

Each of the bearings 12 is a rolling bearing such as a deep groove ball bearing or the like. Each bearing 12 has an outer ring (not illustrated) fitted to an inner periphery of one communication hole 11 and an inner ring (not illustrated) fitted to an outer periphery of the shaft member 13. The outer ring is retained by a retaining ring 15. A spacer 16 is interposed between the inner ring and the proximal-side end link member 5. A fastening force of the nut 14 is transmitted to the inner ring through the proximal-side end link member 5 and the spacer 16 and applies a predetermined preload to the bearing 12.

In each revolute pair of the proximal-side end link member 5 and the intermediate link member 7, two bearings 19 are disposed in each of communication holes 18 formed at opposite ends of each intermediate link member 7. These bearings 19 rotatably support a shaft part 20 of a tip end of the proximal-side end link member 5. The bearings 19 are fastened and fixed by a nut 22 with a spacer 21 interposed therebetween.

Each of the bearings 19 is a rolling bearing such as a deep groove ball bearing. Each bearing 19 has an outer ring (not illustrated) fitted to an inner periphery of one communication hole 18 and an inner ring (not illustrated) fitted to an outer periphery of the shaft part 20. The outer ring is retained by a retaining ring 23. A fastening force of the nut 22 screwed onto a tip threaded portion 20a of the shaft part 20 is transmitted to the inner ring through the spacer 21 and applies a predetermined preload to the bearing 19.

Although the above description is made with reference to the revolute pair of the proximal-side link hub 2 and the proximal-side end link member 5 as well as the revolute pair of the proximal-side end link member 5 and the intermediate link member 7, the same constitution as that of the proximal side is found in a revolute pair of the distal-side link hub 3 and the distal-side end link member 6 as well as a revolute pair of the distal-side end link member 6 and the intermediate link member 7 (illustration omitted).

Thus, the bearings 12, 19 are disposed in the four revolute pairs of each link mechanism 4, namely, the revolute pair of the proximal-side link hub 2 and the proximal-side end link member 5, the revolute pair of the distal-side link hub 3 and the distal-side end link member 6, the revolute pair of the proximal-side end link member 5 and the intermediate link member 7, and the revolute pair of the distal-side end link member 6 and the intermediate link member 7. This makes it possible to reduce rotational resistance by suppressing frictional resistance on the respective revolute pairs so as to ensure smooth power transmission and improve durability.

In the structure including the bearings 12, 19, it is possible to eliminate radial gaps and thrust gaps by applying the preload to the bearings 12, 19 and thereby to suppress backlash in the revolute pairs. This can eliminate a rotational phase difference between the side of the proximal-side link hub 2 and the side of the distal-side link hub 3, and therefore, speed uniformity can be maintained, and generation of vibration and/or noise can be suppressed. In particular, by providing negative bearing gaps between the bearings 12, 19, it is possible to reduce backlash generated between input and output members.

Actuator 53

In FIG. 4, the proximal-side link hub 2 of the parallel link mechanism 1 is fixed to an upper side of the base mount 52. An actuator attachment mount 55 of a flange shape is provided to an outer periphery of an upper part of the base mount 52, and actuators 53 are attached to the actuator attachment mount 55 in a suspended manner. There are three actuators 53, the number of which corresponds to that of the link mechanisms 4. Alternatively, there may be two actuators. Each actuator 53 is constituted by a rotary actuator having an output shaft to which a bevel gear 56 is attached. The bevel gear 56 is engaged with a bevel gear 57 of a fan shape attached to the shaft member 13 (FIG. 7) of the proximal-side end link member 5. Each actuator 53 may be an electric motor.

Each actuator 53 is provided with a rotation angle detector 59 (see FIG. 1B). The rotation angle detector 59 is configured to directly detect a rotation angle of the output shaft of the actuator 53. In the present embodiment, however, the rotation angle detector 59 may be configured to detect a rotation angle $\beta n$ ($\beta 1$, $\beta 2$, ... ) (see FIG. 1A) of the proximal-side end link member 5 by multiplication of a rotation ratio of the output shaft and the shaft member 13 of the proximal-side end link member 5 (a gear ratio of the bevel gears 56, 57) in the control device 54 (for example, in the teaching unit 56 or the control unit 55).

Brief Description of Operation of Link Actuation Device 51

The link actuation device 51 is configured to rotationally drive the respective actuators 53 in accordance with control by the control unit 55 of the control device 54 or operation by the manual operation unit 57 so as to actuate the parallel link mechanism 1. Specifically, as the actuators 53 are rotationally driven, the rotation is transmitted to the shaft members 13 through the pairs of bevel gears 56, 57 to change the rotation angles $\beta n$ of the proximal-side end link members 5 with respect to the proximal-side link hub 2. This determines the position of the distal-side link hub 3 with respect to the proximal-side link hub 2 (hereinafter, referred to as "distal end position"). Instead of the bevel gears 56, 57 as used herein, other mechanisms (for example, spur gears, and worm mechanisms) may be used to change the angles of the proximal-side end link members 5.

The control device 54 is numerically controlled by a computer and is configured to cause the control unit 55 to perform control in accordance with a program stored in the storage unit 58 and data of a distal-side link center B (hereinafter, sometimes referred to as "distal end position"), which is a center position of the distal-side link hub 3. The data of the distal end position may be specified by any of orthogonal coordinates Wt (=Xt, Yt, Zt), polar coordinates ($\theta$, $\varphi$), and rotation angles $\beta n$ of the respective proximal-side end link members 5 as described later.

Where the distal end position is specified by polar coordinates, posture control is performed in the following manner. First, a rotation angle $\beta n$ (n=1, 2, ... ) (FIG. 1A, FIG. 1B, FIG. 3) of each proximal-side end link member 5 is calculated based on the specified distal end position. The "rotation angle $\beta n$" is a rotation angle (an angle from a horizontal plane) of each proximal-side end link member 5 according to the specified distal end position.

The rotation angle $\beta n$ can be calculated by, for example, reverse conversion of the following formula 1. The "reverse conversion" means conversion for calculating a rotation angle $\beta n$ of the proximal-side end link member 5 from a bending angle $\theta$ (FIG. 1A, FIG. 3) between the center axis QA of the proximal-side link hub 2 and the center axis QB of the distal-side link hub 3 and a turning angle $\varphi$ of the output-side link hub 3 with respect to the proximal-side link hub 2. The bending angle $\theta$ and the turning angle $\varphi$ are correlated with the rotation angle $\beta n$, and therefore, it is possible to derive one from the other.

$$\cos(\theta/2)\sin \beta n - \sin(\theta/2)\sin(\varphi + \eta n)\cos \beta n + \sin(\gamma/2) = 0;$$

(n=1,2,3)　　　　　　　　　　　　　　　　(formula 1)

As used herein, an axis angle $\gamma$ (FIG. 1A, FIG. 3) is an angle defined between a coupling center axis of the intermediate link member 7 rotatably coupled to the proximal-side end link member 5 and a coupling center axis of the intermediate link member 7 rotatably coupled to the distal-side end link member 6. The angle ($\eta 1$, $\eta 2$, $\eta 3$ in FIG. 1A) is a separation angle (i.e., a phase angle), in the circumferential direction, of each proximal-side end link member 5 with respect to the proximal-side end link member 5, which serves as a reference.

The orthogonal coordinates are XY orthogonal coordinates which is perpendicular to an extension axis of the center axis QA of the proximal-side link hub 2 and has its origin O defined at an arbitrary position on the extension axis, as shown in FIG. 1A. A target distal end posture is expressed in target coordinates t (Xt, Yt), which are coordinates of a point at which the center axis QB of the distal-side link hub 3 intersects with an XY orthogonal coordinate system. The following description will be made with reference to an example in which the origin O is defined at the proximal-side link center C.

Manual Operation Unit 57

The manual operation unit 57 is configured to rotationally drive the respective actuators 53 in accordance with an input from a manual input device (not illustrated) so as to change the posture of the parallel link mechanism 1. The manual input device may be, for example, a touch panel type liquid crystal display device having a display configured to display move buttons for the respective actuators 53, and may be configured to give a command to an actuator 53 to move by a small angle every time a corresponding one of the move buttons is touched. Alternatively, the manual input device may be a liquid crystal display device having a display configured to display an input box, the display device being configured to receive a numerical input of a rotation angle βn of an end link member 5 or the like.

Teaching Unit 56

The teaching unit 56 is configured to calculate coordinates Wt (=Xt, Yt, Zt) of the distal-side link center when the distal end position of the parallel link mechanism 1 is at an arbitrary position, from rotation angles βn (n=1, 2, or n=1, 2, 3) of the respective proximal-side end link members 5. The parallel link mechanism 1 may be moved to the arbitrary position in accordance with a manual input entered into the manual operation unit 57. Alternatively, the parallel link mechanism 1 may be moved to the arbitrary position by hand, with the respective actuators 53 set to a rotatable state.

The teaching unit 56 includes a conversion unit 61. The conversion unit 61 is configured to calculate the distal-side link center Wt (=Xt, Yt, Zt) (B), which is the center of the distal-side link hub 3 expressed in orthogonal coordinates, as a posture of the distal-side link hub 3 from rotation angles βn (n=1, 2, . . . ) of at least two of the end link members 5 coupled to the actuators 53 by the following normal vector or formulae.

Orthogonal Coordinates

The orthogonal coordinates are defined in an orthogonal coordinate system having:

(1) an origin at an intersection C between the center axis QA of the proximal-side link hub 2 and a two-dimensional orthogonal coordinate system perpendicular to the center axis QA;

(2) a coordinate axis, as a Z axis, having a positive direction extending away from the proximal-side link hub 2 along the center axis QB of the distal-side link hub 3 placed at the bending angle θ of 0°; and (3) an X axis and a Y axis constituted as a right-handed coordinate system with respect to the Z axis.

Formulae

The formulae (expressions for a normal vector Nn (An, Bn, Cn)) are shown below. The normal vector Nn (An, Bn, Cn) will be described later.

[Math 3]
$$An = lo \cos\left(\frac{\pi}{2} - \gamma/2\right)\cos(\beta n)\cos(\eta n)$$
$$Bn = lo \cos\left(\frac{\pi}{2} - \gamma/2\right)\cos(\beta n)\sin(\eta n)$$
$$Cn = lo \cos\left(\frac{\pi}{2} - \gamma/2\right)\sin(\beta n)$$

wherein n: a number (=1, 2, . . . ) indicating the system of each link mechanism, lo: a distance (fixed value) between the center C of the proximal-side link hub and the center B of the distal-side link hub, γ: an axis angle of the intermediate link member (an angle defined by coupling center axes of connections at which the opposite ends of the intermediate link member are coupled to the end link members), βn: a rotation angle of a base end of each end link member, and ηn: a phase angle.

A relational expression between the normal vector Nn (An, Bn, Cn) and the distal-side link center Wt (=Xt, Yt, Zt) (B), which is the center of the distal-side link hub, may be obtained from the above relations as needed.

According to this constitution, in the link actuation device including the parallel link mechanism 1 having two degrees of freedom, the distal-side link center B expressed in orthogonal coordinates can be calculated from rotation angles βn of end link members 5, without calculating an approximate solution. Thus, iterative calculations as in a case of calculating an approximate solution are not necessary, and therefore the coordinates can be accurately calculated in a shorter time.

The Reason why the Above Formulae are Valid

The following describes the reason why the coordinates Wt (=Xt, Yt, Zt) (B) of the distal-side link center can be calculated from the rotation angles βn (n=1, 2 or n=1, 2, 3) of the respective end link members by the above formulae.

FIG. 1A shows the structure of the parallel link mechanism 1, and FIG. 3 shows postures of joints. In FIG. 3, the distal-side link center B is expressed by θ, φ, with a reference of the coordinate system located at an intersection between the proximal-side link center line QA and the distal-side link center line QB. The conversion unit 61 (FIG. 1B) is configured to derive a relational expression of the position of the distal-side link center B using the proximal-side link center C as a reference of the coordinate system, from relational expressions two of three link systems, namely, a first link mechanism 4-1, a second link mechanism 4-2, and a third link mechanism 4-3.

First, one link system is considered (FIG. 3). The link mechanism 4 can be theoretically expressed by two linear segments a, b of a same length, which are shown by one-dot chain lines, and an intersection A of the segments a and b. The segment a is a part of a linear line along the coupling center axis at one end of the intermediate link member 7 from the intersection A to the proximal-side link center C, and the segment b is a part of the linear line from the intersection A to the distal-side link center B. An orbital circle CI of the point A is defined by an intersection between a proximal-side spherical surface SC (radius: the segment a, center: the proximal-side link center C) and a distal-side spherical surface SB (radius: the segment b, center: the distal-side link center B). A plane including the orbital circle CI of the point A is shown as a constant-speed bisecting plane E. The proximal-side part and the distal-side part of the parallel link mechanism 1 are plane-symmetric to each other with respect to the constant-speed bisecting plane E.

Since the axis angle γ is constant in the parallel link mechanism 1, the distance between end points opposite from the intersection A of the segments a, b is constant. Accordingly, the distance lo between the proximal-side link center C and the distal-side link center B is constant. Therefore, the distal-side link center B draws a circular orbit TB (see FIG. 9) having a rotation center at the proximal-side segment a (AC) and a radius corresponding to the distance lo between the proximal-side link center C and the distal-side link center B. In the parallel link mechanism 1, the link mechanisms 4 of the respective systems have circular orbits TB intersecting at the distal-side link center B. By using this relation, the distal end position B of the parallel link mechanism 1 is derived as the distal-side link center Wt (=Xt, Yt, Zt) (B).

Figure 8:
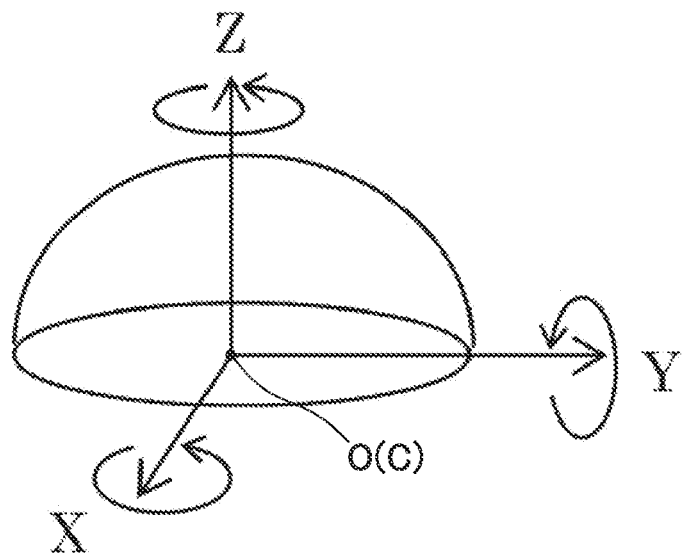
FIG. 8 is a perspective view of an orthogonal coordinate system of the parallel link mechanism.

FIG. 8 shows a world coordinate system expressed by this relational expression. The origin O of the coordinate system is at the proximal-side link center C.

Figure 9:
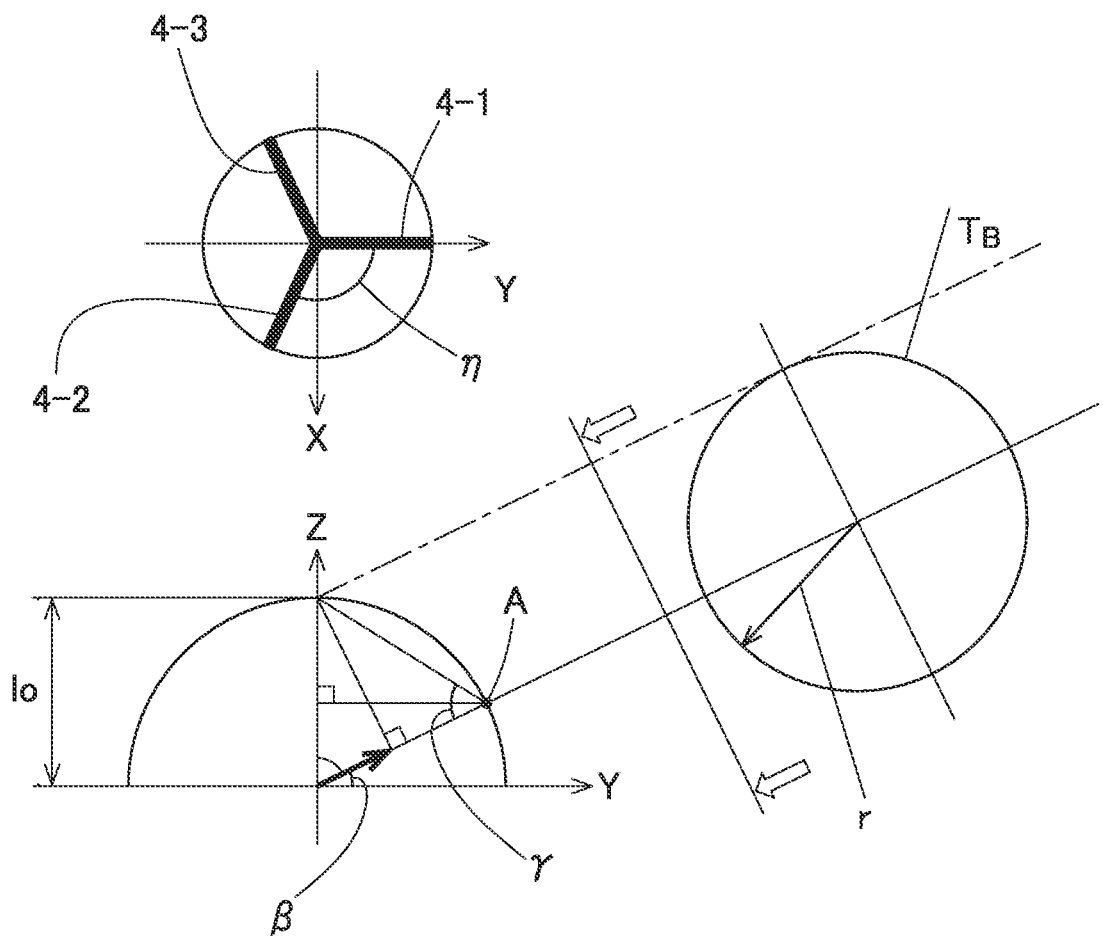
FIG. 9 illustrates an orbit of a distal-side link center of the parallel link mechanism.

FIG. 9 shows the distal-side link center orbit TB (the orbit of the distal-side link center B). The distal-side link center orbit TB shown in FIG. 9 is of the first link mechanism 41. In the arrangement of the three link mechanisms 4, an intersection of the distal-side orbits TB of the respective link mechanisms 4 is located at the distal-side center position (distal-side link center B). This can be understood as that an orbital circle of a link mechanism 4 of one system intersects with a link intersection of link mechanisms 4 of other two systems (an intersection of the orbital circles, or in other words, an intersection of the distal-side orbits TB). Accordingly, the link intersection of the link mechanisms 4 of the two systems is determined. That is, the distal-side link center B can be derived with two degrees of freedom.

The distal-side link center orbit TB of each link mechanism 4 within a three-dimensional space satisfies the following two equations with an AND condition:

plane: $An(X-An)+Bn(Y-Bn)+Cn(Z-Cn)=0$, sphere: $(X-An)^2+(Y-Bn)^2+(Z-Cn)^2=r^2$, wherein the vector Nn is a normal vector (An, Bn, . . . ),
n: a number (=1, 2, . . . ) indicating the system of each link mechanism.

Normal Vector

The normal vector Nn (An, Bn, Cn) is a vector extending from the origin (proximal-side link center C) toward the center of the distal-side link center orbit TB in FIG. 9. Note that the components An, Bn, Cn of the normal vector Nn denote axial components in the orthogonal coordinate system.

The normal vector is shown below.

$$An = lo \cos\left(\frac{\pi}{2} - \gamma/2\right)\cos(\beta n)\cos(\eta n)$$ [Math 4]

$$Bn = lo \cos\left(\frac{\pi}{2} - \gamma/2\right)\cos(\beta n)\sin(\eta n)$$

$$Cn = lo \cos\left(\frac{\pi}{2} - \gamma/2\right)\sin(\beta n)$$

wherein n: a number (=1, 2, . . . ) indicating the system of each link mechanism,
lo: a distance (fixed value) between the center C of the proximal-side link hub and the center B of the distal-side link hub,
γ: an axis angle of the intermediate link member (an angle defined by two coupling center axes of connections at which the opposite ends of the intermediate link member are coupled to the end link members),
βn: a rotation angle of a base end of each end link member,
ηn: a phase angle, and
An, Bn, Cn: axial components in the orthogonal coordinate system.

The radius of the distal end orbit is shown below.

$$r = lo \sin\left(\frac{\pi}{2} - \gamma/2\right)$$ [Math 5]

Normal vectors n1, n2 are applied to the above equations of a plane and of a sphere, and the equations are rearranged. The coordinates of the distal end center (the coordinates of the distal-side link center) are denoted as Wt (=Xt, Yt, Zt) (B).

The above coordinates are the coordinates of the distal-side link center when the proximal part link center is used as the origin of the world coordinate system. It should be noted that in an actual mechanism including the link actuation device constructed such that a work machine (not illustrated) is attached to the distal-side link hub 3 to perform work on a workpiece, the mechanism being configured to specify or control the position of the distal-side link hub 3 by using operating points of the workpiece, it is possible to use relational expressions such as coordinates of the distal-side link center and coordinates of the workpiece.

In order to justify the above relational expressions, conventional control expressions are shown below:

$$\beta n = \sin^{-1}\left(\frac{G+H+I}{\sqrt{2}\sin\alpha}\right) \pm \frac{\pi}{4}$$ [Math 6]

$$G = \cos(\gamma/2)\cos\varepsilon_n\{-\sin(\theta/2)\cos(\phi-\eta_n) + \sin(\phi-\eta_n)\cos(\phi-\eta_n)(\cos(\theta/2)-1)\}$$

$$H = \cos(\gamma/2)\sin\varepsilon_n\{-\sin(\theta/2)\sin(\phi-\eta_n) + \cos(\theta/2)\sin^2(\phi-\eta_n) + \cos^2(\phi-\eta_n)\}$$

$$I = \sin(\gamma/2)\{\cos(\theta/2) + \sin(\theta/2)\sin(\phi-\eta_n)\}$$

wherein θ: a bending angle,
φ: a turning angle,
γ: an axis angle of the intermediate link,
ηn: a separation angle of the proximal-side arm (proximal-side end link member),
α: an arm angle,
εn: a phase of a revolute pair part of the proximal-side arm and the intermediate link, and
n: number denoting each link system In this procedure, since the arm angle α is not necessary in the calculation process as shown in the relational expressions, it is not necessary to consider the arm angle. That is, the rotation angles of the respective axes are irrelevant with the arm angle α.

As discussed above, in the present embodiment, the formulae are established which incorporate the normal vectors applied to the above equations of a plane and of a sphere. By using the formulae in teaching, the distal-side link center B expressed in orthogonal coordinates can be calculated from the rotation angles βn of the end link members 5, without calculating an approximate solution. Thus, iterative calculations as in a case of calculating an approximate solution are not necessary, and therefore, the coordinates can be accurately calculated in a shorter time.

Figure 10A:
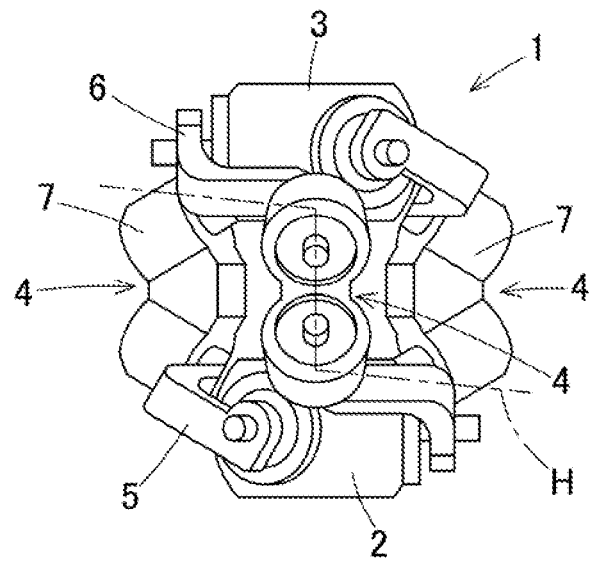
FIG. 10A is a perspective view illustrating a rotationally-symmetric configuration of the parallel link mechanism.
Figure 10B:
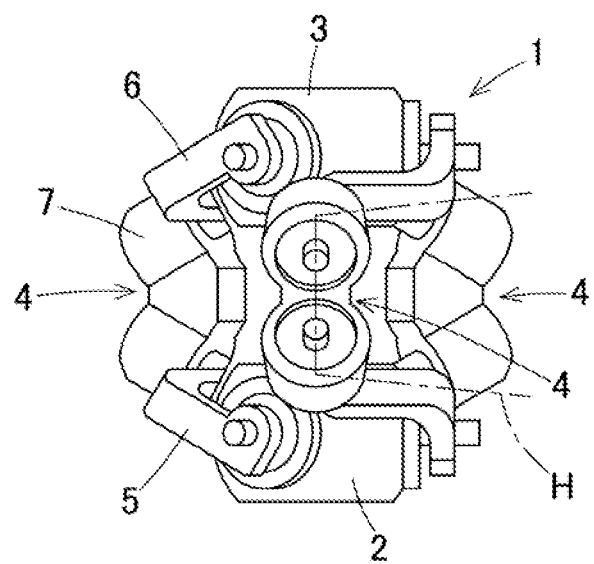
FIG. 10B is a perspective view illustrating a mirror-symmetric configuration of the parallel link mechanism.

In should be noted that the above embodiment has been described with reference to an example in which the parallel link mechanism 1 is of a rotationally-symmetric type; however, the present invention may also be applied to a parallel link mechanism of a mirror-symmetric type. FIG. 10A and FIG. 10B show that there are two constitutions of the parallel link mechanism. FIG. 10A shows a rotationally-symmetric type, and FIG. 10B shows a mirror-symmetric type. Both of these can be represented with a theoretical expression from the proximal-side link center C to the distal-side link center B as shown in FIG. 10C. A segment H shows a linear model (see FIG. 6). Note that although FIG. 10A and FIG. 10B show a rotational system having a reverse link mechanism 4 with respect to a center line, the rotational system can also be expressed as in FIG. 10C in the similar manner.

Control Unit 55

The above description is made with reference to the case where the formulae are applied to the teaching unit 56; however, the above formulae may also be applied to the control unit 55.

In such a case, the control unit 55 includes a conversion unit 61A. The conversion unit 61A is configured to calculate rotation angles βn (n=1, 2, . . . ) of at least two of the end link members 5 coupled to the respective actuators 53 as a posture of the distal-side link hub 3 from the distal-side link center Wt (=Xt, Yt, Zt) (B), which is the center of the distal-side link hub 3 expressed in orthogonal coordinates by the following normal vector or formulae. The orthogonal coordinates and the respective formulae are the same as those described above for the teaching unit 56, they are reproduced below.

Orthogonal Coordinates

The orthogonal coordinates are defined in an orthogonal coordinate system having:

(1) an origin at an intersection between the center axis of the proximal-side link hub and a two-dimensional orthogonal coordinate system perpendicular to the center axis;

(2) a coordinate axis, as a Z axis, having a positive direction extending away from the proximal-side link hub along the center axis of the distal-side link hub placed at the bending angle θ of 0°; and (3) an X axis and a Y axis constituted as a right-handed coordinate system with respect to the Z axis.

Formulae

The formulae (expressions for a normal vector Nn (An, Bn, Cn)) are shown below.

$$An = lo \cos\left(\frac{\pi}{2} - \gamma/2\right)\cos(\beta n)\cos(\eta n)$$
$$Bn = lo \cos\left(\frac{\pi}{2} - \gamma/2\right)\cos(\beta n)\sin(\eta n)$$
$$Cn = lo \cos\left(\frac{\pi}{2} - \gamma/2\right)\sin(\beta n)$$

[Math 7]

wherein n: a number (=1, 2, . . . ) indicating the system of each link mechanism, lo: a distance (fixed value) between the center C of the proximal-side link hub and the center B of the distal-side link hub, γ: an axis angle of the intermediate link member (an angle defined by two coupling center axes of connections at which the opposite ends of the intermediate link member are coupled to the end link members), βn: a rotation angle of a base end of each end link member, ηn: a phase angle, and An, Bn, Cn: axial components in the orthogonal coordinate system.

A relational expression between the normal vector Nn (An, Bn, Cn) and the distal-side link center Wt (=Xt, Yt, Zt) (B), which is the center of the distal-side link hub, may be obtained from the above relations as needed.

In the case of this constitution, in the link actuation device including the parallel link mechanism having two degrees of freedom, rotation angles of the end link members can be calculated from the distal-side link center expressed in orthogonal coordinates, without calculating an approximate solution. Thus, iterative calculations as in a case of calculating an approximate solution are not necessary, and therefore, the rotation angles can be accurately calculated in a shorter time. Thus, in a case of multi-point movement, an equipment takt time can be reduced thanks to high-speed movement. In addition, since the rotation angles are accurately calculated, accuracy of fixed-torque addition control for suppressing shaking due to mechanistic play is improved, leading to improved positioning accuracy and/or orbital accuracy.

Although the preferred embodiments of the present invention have been described with reference to the drawings, the present invention is not limited to the above embodiments, and various additions, modifications, or deletions may be made without departing from the scope of the invention. Accordingly, such variants are included within the scope of the present invention.

REFERENCE NUMERALS

1 . . . parallel link mechanism
2 . . . proximal-side link hub
3 . . . distal-side link hub
4 (4-1 to 4-3) . . . link mechanism
5 . . . proximal-side end link member
6 . . . distal-side end link member
7 . . . intermediate link member
51 . . . link actuation device
53 . . . actuator
54 . . . control device
55 . . . control unit
56 . . . teaching unit
57 . . . manual operation unit
59 . . . rotation angle detector
61, 61A . . . conversion unit
A . . . intersection
B . . . distal-side link center
C . . . proximal-side link center
PA . . . proximal-side link center
PB . . . distal-side link center
QA . . . center axis of the proximal-side link hub
QB . . . center axis of the distal-side link hub

What is claimed is:

1. A control device for a link actuation device, the control device being configured to control actuators of the link actuation device, the link actuation device including:
a parallel link mechanism including
a proximal-side link hub,
a distal-side link hub,
three or more link mechanisms coupling the distal-side link hub to the proximal-side link hub such that a posture of the distal-side link hub can be changed with respect to the proximal-side link hub, each of the link mechanisms including a proximal-side end link member having one end rotatably coupled to the proximal-side link hub, a distal-side end link member having one end rotatably coupled to the distal-side link hub, and an intermediate link member having opposite ends rotatably coupled to other ends of the proximal-side end link member and the distal-side end link member, each of the link mechanisms being shaped such that in a geometric model representing that link mechanism by straight lines, a proximal-side part and a distal-side part of that link mechanism with respect to a center part of the intermediate link member are symmetrical to each other; and
the actuators configured to turn proximal-side end link members of two or more link mechanisms of the three or more link mechanisms,
wherein the control device comprises a teaching unit configured to teach a posture of the distal-side link hub,
the teaching unit includes a conversion unit configured to calculate coordinates Wt (=Xt, Yt, Zt) of a distal-side link center, which is a center of the distal-side link hub expressed in orthogonal coordinates, as the posture of the distal-side link hub from rotation angles βn (n=1, 2, . . . ) of the at least two end link members coupled to the respective actuators, the orthogonal coordinates are defined in an orthogonal coordinate system having an origin at an intersection between a center axis of the proximal-side link hub and a two-dimensional orthogonal coordinate system perpendicular to the center axis, and a coordinate axis, as a Z axis, having a positive direction extending away from the proximal-side link hub along a center axis of the distal-side link hub placed at a bending angle θ of 0°, the bending angle being a vertical angle at which the center axis of the distal-side link hub is inclined with respect to the center axis of the proximal-side link hub, and an X axis and a Y axis constituted as a right-handed coordinate system with respect to the Z axis, the conversion unit is configured to apply a normal vector to the following equations of a plane and of a sphere, the normal vector being a vector extending from a proximal-side link center, which is a center of the proximal-side link hub, toward an orbital center of the distal-side link center, the normal vector is a normal vector Nn (An, Bn, Cn) expressed by the following formulae:

$$An = lo\cos\left(\frac{\pi}{2} - \gamma/2\right)\cos(\beta n)\cos(\eta n)$$ [Math 1]

$$Bn = lo\cos\left(\frac{\pi}{2} - \gamma/2\right)\cos(\beta n)\sin(\eta n)$$

$$Cn = lo\cos\left(\frac{\pi}{2} - \gamma/2\right)\sin(\beta n)$$

wherein n: a number (=1, 2, . . . ) indicating the system of each link mechanism, lo: a distance (fixed value) between the center C of the proximal-side link hub and the center B of the distal-side link hub, γ: an axis angle of the intermediate link member (an angle defined by two coupling center axes of connections at which the opposite ends of the intermediate link member are coupled to the end link members), βn: a rotation angle of a base end of each end link member, ηn: a phase angle, and An, Bn, Cn: axial components in the orthogonal coordinate system, wherein a distal-side link center orbit of each of the link mechanisms within a three-dimensional space of the orthogonal coordinates satisfies the following equations of a plane and of a sphere with an AND condition:

plane: $An(X-An)+Bn(Y-Bn)+Cn(Z-Cn)=0$, sphere: $(X-An)^2+(Y-Bn)^2+(Z-Cn)^2=r^2$, wherein r is determined by the following formula:

$$r = lo\sin\left(\frac{\pi}{2} - \gamma/2\right)$$ [Math 2]

wherein r: an orbital radius of the distal-side link center.

2. The control device as claimed in claim 1, wherein the parallel link mechanism has a rotationally-symmetric configuration.

3. The control device as claimed in claim 1, wherein the parallel link mechanism has a mirror-symmetric configuration.

4. A control device for a link actuation device, the control device being configured to control actuators of the link actuation device, the link actuation device including:

a parallel link mechanism including
 a proximal-side link hub,
 a distal-side link hub,
 three or more link mechanisms coupling the distal-side link hub to the proximal-side link hub such that a posture of the distal-side link hub can be changed with respect to the proximal-side link hub, each of the link mechanisms including a proximal-side end link member having one end rotatably coupled to the proximal-side link hub, a distal-side end link member having one end rotatably coupled to the distal-side link hub, and an intermediate link member having opposite ends rotatably coupled to other ends of the proximal-side end link member and the distal-side end link member, each of the link mechanisms being shaped such that in a geometric model representing that link mechanism by straight lines, a proximal-side part and a distal-side part of that link mechanism with respect to a center part of the intermediate link member are symmetrical to each other; and the actuators configured to turn proximal-side end link members of two or more link mechanisms of the three or more link mechanisms, wherein a control unit configured to control the respective actuators includes a conversion unit configured to calculate rotation angles βn (n=1, 2, . . . ) of the at least two proximal-side end link members coupled to the respective actuators from a distal-side link center Wt (=Xt, Yt, Zt), which is a center of the distal-side link hub expressed in orthogonal coordinates, as the posture of the distal-side link hub, the orthogonal coordinates are defined in an orthogonal coordinate system having an origin at an intersection between a center axis of the proximal-side link hub and a two-dimensional orthogonal coordinate system perpendicular to the center axis, and a coordinate axis, as a Z axis, having a positive direction extending away from the proximal-side link hub along a center axis of the distal-side link hub placed at a bending angle θ of 0°, the bending angle being a vertical angle at which the center axis of the distal-side link hub is inclined with respect to the center axis of the proximal-side link hub, and an X axis and a Y axis constituted as a right-handed coordinate system with respect to the Z axis, the conversion unit is configured to apply a normal vector to the following equations of a plane and of a sphere, the normal vector being a vector extending from a proximal-side link center, which is a center of the proximal-side link hub, toward an orbital center of the distal-side link center, the normal vector is a normal vector Nn (An, Bn, Cn) expressed by the following formulae:

$$An = lo\cos\left(\frac{\pi}{2} - \gamma/2\right)\cos(\beta n)\cos(\eta n)$$ [Math 3]

$$Bn = lo\cos\left(\frac{\pi}{2} - \gamma/2\right)\cos(\beta n)\sin(\eta n)$$

$$Cn = lo\cos\left(\frac{\pi}{2} - \gamma/2\right)\sin(\beta n)$$

wherein n: a number (=1, 2, . . . ) indicating the system of each link mechanism, lo: a distance (fixed value) between the center C of the proximal-side link hub and the center B of the distal-side link hub, γ: an axis angle of the intermediate link member (an angle defined by two coupling center axes of connections at which the opposite ends of the intermediate link member are coupled to the end link members), βn: a rotation angle of a base end of each end link member, ηn: a phase angle, and An, Bn, Cn: axial components in the orthogonal coordinate system, wherein a distal-side link center orbit of each of the link mechanisms within a three-dimensional space of the orthogonal coordinates satisfies the following equations of a plane and of a sphere with an AND condition:

plane: $An(X-An)+Bn(Y-Bn)+Cn(Z-Cn)=0$, sphere: $(X-An)^2+(Y-Bn)^2+(Z-Cn)^2=r^2$, wherein r is determined by the following formula:

$$r = lo\sin\left(\frac{\pi}{2} - \gamma/2\right) \quad \text{[Math 4]}$$

wherein r: an orbital radius of the distal-side link center.

* * * * *